(12) United States Patent
Fioravanti

(10) Patent No.: US 8,020,915 B2
(45) Date of Patent: Sep. 20, 2011

(54) OPENABLE ROOF SYSTEM FOR A MOTOR CAR

(75) Inventor: Leonardo Fioravanti, Moncalieri (IT)

(73) Assignee: Fioravanti SRL, Turin (IT)

( * ) Notice: Subject to any disclaimer, the term of this patent is extended or adjusted under 35 U.S.C. 154(b) by 630 days.

(21) Appl. No.: 11/718,083

(22) PCT Filed: Nov. 16, 2005

(86) PCT No.: PCT/EP2005/056000
§ 371 (c)(1),
(2), (4) Date: Apr. 26, 2007

(87) PCT Pub. No.: WO2006/053876
PCT Pub. Date: May 26, 2006

(65) Prior Publication Data
US 2009/0230720 A1 Sep. 17, 2009

(30) Foreign Application Priority Data
Nov. 18, 2004 (IT) .............................. TO20040151 U

(51) Int. Cl.
*B60J 7/00* (2006.01)
(52) U.S. Cl. ............................... 296/107.08; 296/136.06
(58) Field of Classification Search ............. 296/107.08, 296/136.05, 136.06
See application file for complete search history.

(56) References Cited

U.S. PATENT DOCUMENTS

| | | | | |
|---|---|---|---|---|
| 1,225,384 A * | 5/1917 | Wildau | ......................... | 296/116 |
| 4,165,122 A * | 8/1979 | Bertone | ................... | 296/107.18 |
| 5,056,857 A * | 10/1991 | Ney et al. | .................... | 296/107.2 |
| 5,979,970 A * | 11/1999 | Rothe et al. | .............. | 296/107.17 |
| 6,318,793 B1 * | 11/2001 | Rapin et al. | .............. | 296/107.17 |
| 6,347,828 B1 * | 2/2002 | Rapin et al. | .............. | 296/107.17 |
| 6,431,636 B1 * | 8/2002 | Schutt | ....................... | 296/107.18 |
| 6,497,447 B1 * | 12/2002 | Willard | ......................... | 296/108 |
| 6,582,009 B2 * | 6/2003 | Wezyk et al. | .............. | 296/180.1 |
| 7,036,866 B2 * | 5/2006 | Perakis | ....................... | 296/107.2 |
| 7,156,446 B2 * | 1/2007 | Perakis | ....................... | 296/107.2 |
| 7,303,225 B2 * | 12/2007 | Heselhaus et al. | ....... | 296/107.18 |
| 2009/0096241 A1 * | 4/2009 | Miyajima et al. | .......... | 296/37.16 |

FOREIGN PATENT DOCUMENTS

| | | |
|---|---|---|
| DE | 43 24 708 A1 | 1/1995 |
| DE | 103 08 063 A1 | 9/2004 |
| DE | 103 31 625 B3 | 1/2005 |
| EP | 0 261 379 A2 | 3/1988 |
| FR | 2 722 151 A1 | 1/1996 |
| NL | 1016394 C2 | 4/2002 |
| WO | WO 03076222 A1 * | 9/2003 |

* cited by examiner

*Primary Examiner* — Joseph Pape
(74) *Attorney, Agent, or Firm* — Sughrue Mion, PLLC

(57) ABSTRACT

The openable roof system (R) comprises: a covering element or roof (3) which in the vicinity of its rear end (3b) is mounted rotatably about a horizontal axis (4) between two parallel side uprights (5) of the bodywork of the motor car (1), close to the rear of the passenger compartment (2), and; an essentially vertical stowage compartment (6) open towards the top, formed in the motor car (1) between and below said uprights (5). The arrangement is such that the covering element or roof (3) can be pivoted about the axis (4) between a closed position, where it is arranged so as to lie at least approximately horizontally, and a midway open position, where it is arranged so as to lie substantially vertically. The covering element or roof (3) is then displaceable downwards from said midway open position into a final concealed position where it is contained so as to lie substantially vertically inside the stowage compartment (6).

11 Claims, 4 Drawing Sheets

OPENABLE ROOF SYSTEM FOR A MOTOR CAR

The present invention relates to an openable roof system of the concealable type for motor cars.

One object of the invention is to provide an openable roof system of the improved type, able to overcome some drawbacks of the systems according to the prior art, such as for example the limited usability of the rear boot compartment.

This and other objects are achieved according to the invention by means of an openable roof system for a motor car comprising:

- a covering element or roof which in the vicinity of its rear end is mounted rotatably about an axis which is substantially horizontal relative to two parallel side uprights of the bodywork of the motor car, close to the rear of the passenger compartment, and;
- an essentially vertical stowage compartment formed in the motor car between and below said uprights and able to receive said covering element or roof;
- the arrangement being such that the covering element can be pivoted about the abovementioned axis between a closed position, where it is arranged so as to lie approximately horizontally, and a midway open position, where it is arranged so as to lie substantially vertically; the covering element or roof then being displaceable downwards from said midway open position into a final concealed position where it is contained so as to lie substantially vertically inside said stowage compartment.

In a first embodiment, the covering element or roof can be moved from the closed position to the concealed position inside the stowage compartment, and vice versa, in a completely manual manner.

In alternative embodiments, the covering element or roof can be moved between the abovementioned positions in a completely motorized manner.

According to a variation of embodiment, the abovementioned covering element or roof comprises at least two panels which are able to assume an unfolded operative configuration, where they are arranged longitudinally adjacent, one as the extension of the other, and a retracted configuration, where they are arranged at least partly superimposed and in the longitudinal direction have a reduced volume, the stowage compartment having in the vertical direction a correspondingly reduced size sufficient for receiving said covering element or roof with the panels arranged in the retracted configuration.

Further characteristic features and advantages of the invention will appear from the detailed description which follows, provided purely by way of a non-limiting example, with reference to the accompanying drawings which show schematically side views of four variations of embodiment of an openable roof system for a motor car.

Figure 1:
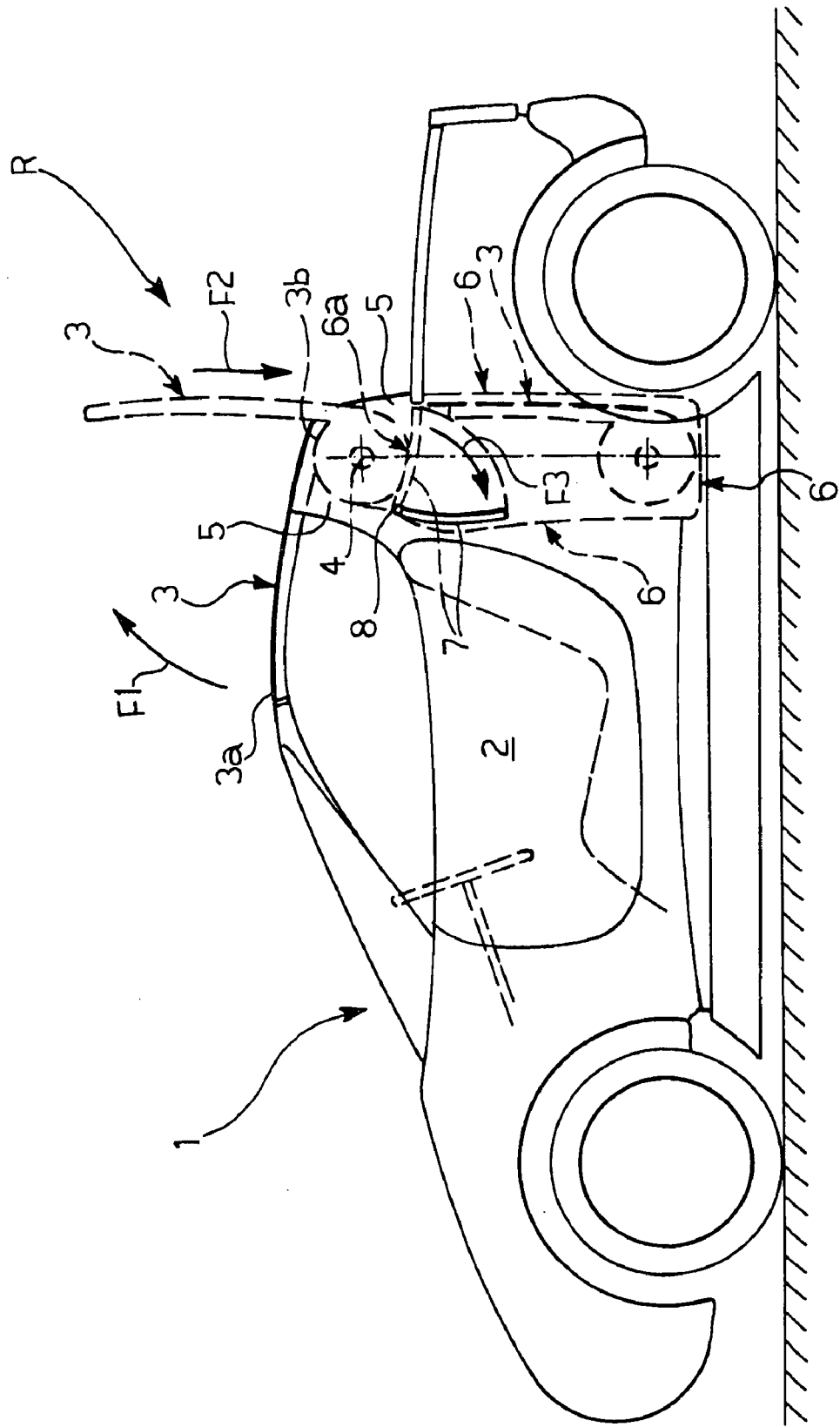

In FIG. 1, 1 denotes in its entirety a motor car. In the non-limiting example illustrated, the motor car 1 has a passenger compartment 2 with only two seats, i.e. one for the driver and one for a passenger. The motor car 1 of FIG. 1 is equipped with an openable roof system of the concealable type which is denoted overall by R.

In the example according to FIG. 1, the openable roof system R comprises a covering element or roof 3 having a front side or end 3a and a rear side or end 3b.

In the vicinity of its rear end 3b, the covering element or roof 3 is mounted rotatably about a substantially horizontal axis 4, between two parallel side uprights 5 of the bodywork of the motor car, close to the rear part of the passenger compartment 2.

Inside the motor car 1, an essentially vertical stowage compartment 6 is provided between and below the uprights 5. This stowage compartment 6 extends in the transverse direction of the motor car and is open towards the top, in the region of an upper opening or mouth indicated by 6a.

As indicated by the arrow F1, the covering element or roof 3 is pivotable about the axis 4 between a closed position, shown in solid lines, where it is arranged so as to lie at least approximately horizontally, and a midway open position, shown in broken lines, where it is arranged so as to lie substantially vertically. As indicated by the arrow F2, the covering element or roof 3 can then be displaced downwards from said midway open position into a final concealed position, likewise shown in broken lines in the bottom part of FIG. 1, where it is contained so as to lie substantially vertically inside the stowage compartment 6.

By means of the subsequent reversal of the movements described above, the covering element or roof 3 can be moved from the concealed position into the closed position.

The openable roof system may be designed so that the movement of the covering element or roof 3 from the closed position into the concealed position, and vice versa, may be performed in a completely manual manner. Alternatively, this movement may be totally motorized, with the use of electromechanical or electrohydraulic devices, or also electropneumatic devices, of a type known per se. For controlling the vertical movement of the covering element or roof 3 it is possible to use guiding and displacement devices of widely varying types, for example rack and pinion devices, etc.

Conveniently, a movable closing hatch 7, which can be pivoted about a horizontal axis 8, may be associated with the upper opening 6a of the stowage compartment 6 through which the covering element or roof 3 is intended to pass. In the embodiment shown, this hatch 7 can be pivoted about an axis 8 which extends in the vicinity of its front end.

In the drawings, the closing hatch 7 is shown in solid lines in the open position and in broken lines in the closed position. The movement of this hatch from the latter position to the open position is performed substantially in the direction indicated by the arrow F3.

Figure 2:
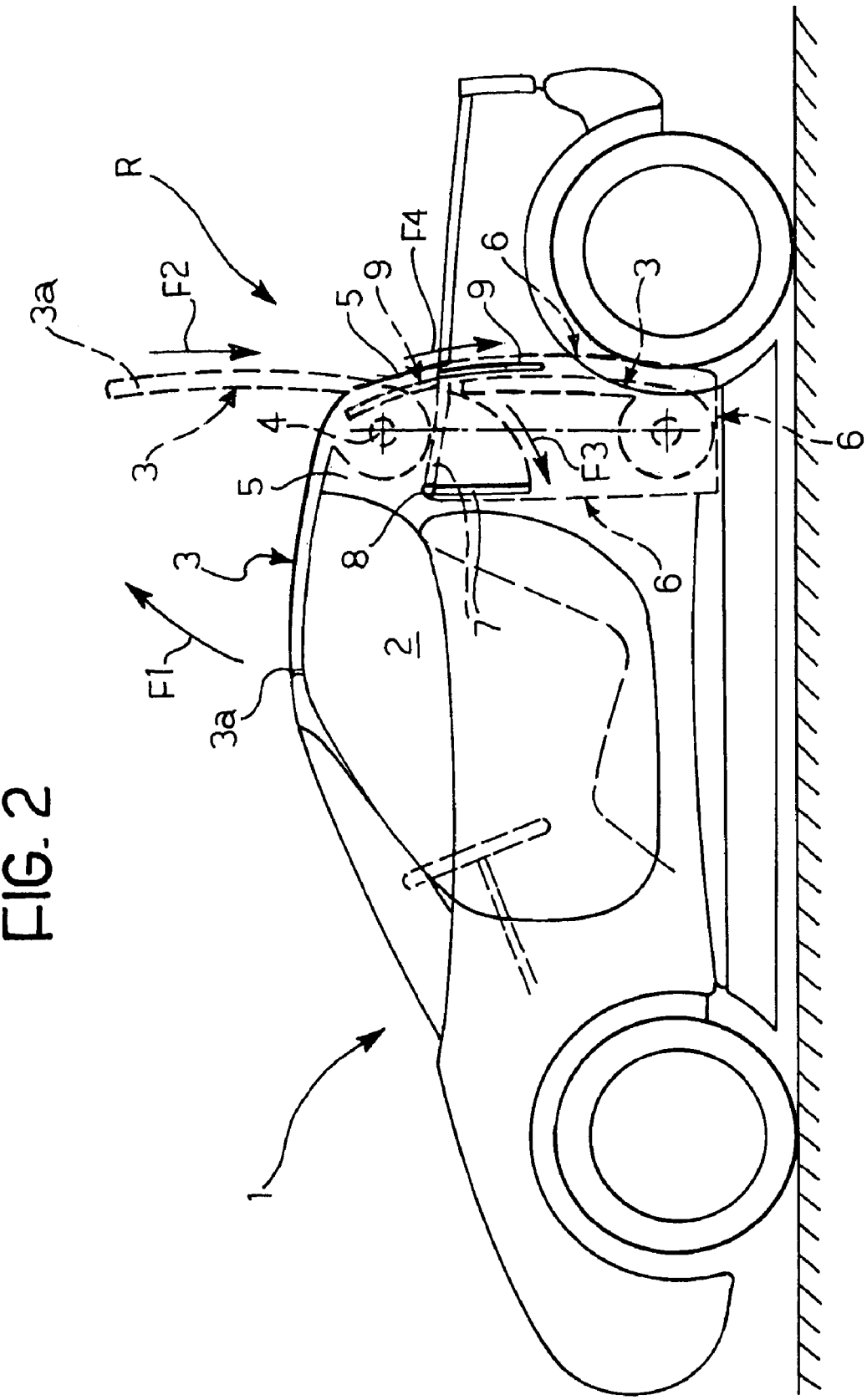

FIG. 2 shows a variation of embodiment. In this figure parts and elements already described have been again assigned the alphanumeric reference symbols used previously.

In the variation according to FIG. 2, a rear window 9 is mounted between the uprights 5 of the motor car bodywork, said window being essentially displaceable and/or rotatable between a raised operative position shown in broken lines and a lowered rest position, shown in solid lines. In this latter position, the window 9 is housed concealingly inside a receiving recess provided in the bodywork of the motor car 1, between and below the uprights 5 and preferably provided inside the stowage compartment 6, as shown precisely in FIG. 2.

The arrow F4 of FIG. 2 indicates the downward movement of the rear window 9 from the operative position into the concealed rest position.

Figure 3:
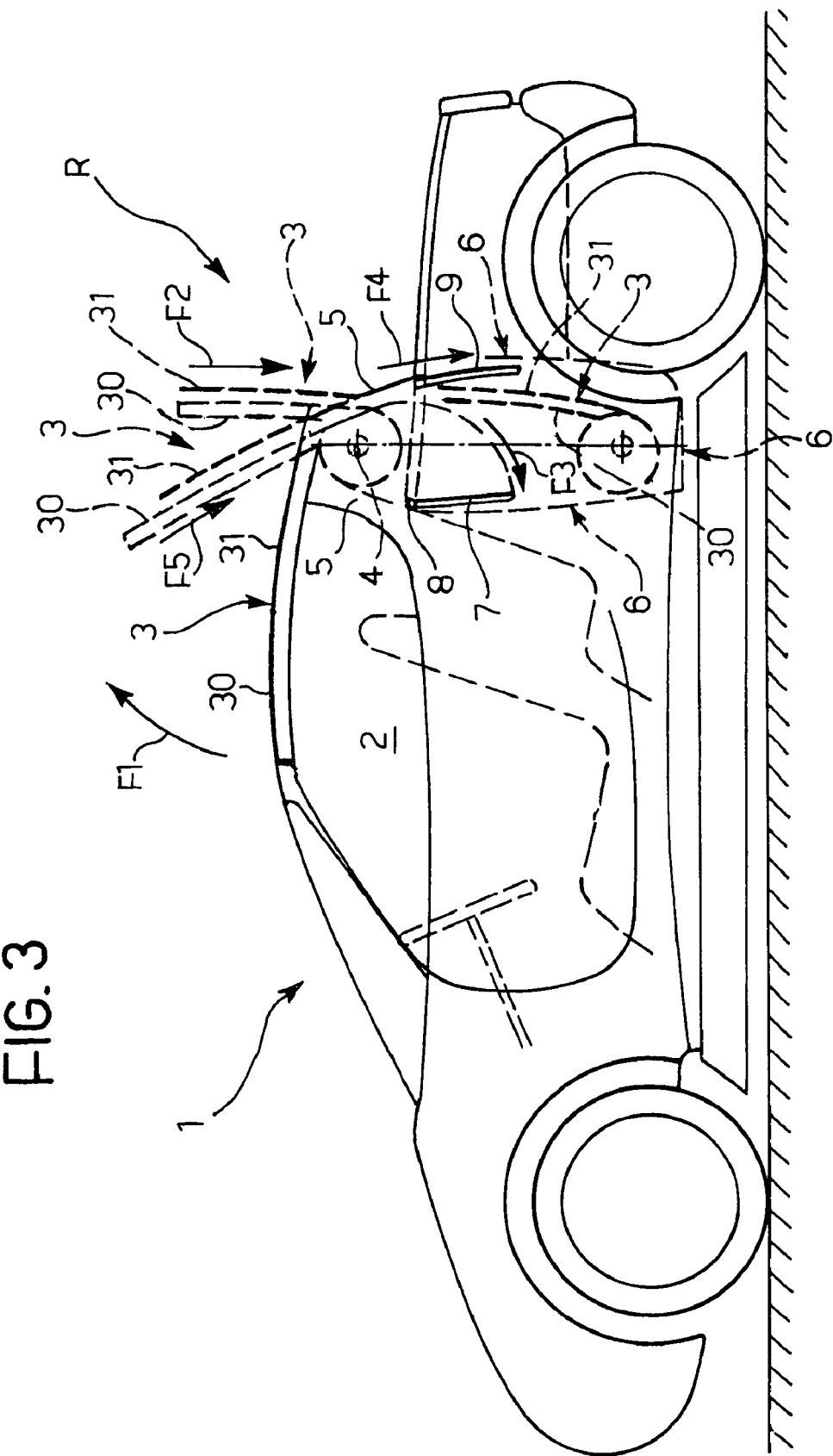

FIG. 3 shows a further variation of embodiment. In this figure also, parts and elements already described have again been assigned the same alphanumeric reference symbols used previously.

In the embodiment according to FIG. 3, the car 1 shown is of the type having a passenger compartment with 2 rows of 2 seats. The covering element or roof 3 of this motor car comprises (at least) two panels 30 and 31 which can assume an unfolded operative configuration, shown in solid lines, where they are arranged longitudinally adjacent, one as the extension of the other. The panels 30, 31 of the roof 3 are moreover able to assume a retracted configuration, where they are arranged at least partly superimposed and have overall a longitudinally reduced volume. In FIG. 3 the covering element or roof 3 is shown in broken lines in a midway condition between the unfolded configuration and the retracted configuration and then, again in broken lines, in the retracted configuration reached when this covering element or roof 3 is in the angular open position lying essentially vertically.

Embodiments of a covering element or roof comprising retractable and unfoldable panels of the type mentioned above are known per se and will therefore not be further described as regards their details.

In the openable roof system according to FIG. 3, the covering element or roof is made to pass from the closed position, where its panels 30 and 31 are in the unfolded configuration, into the midway position where said panels are arranged in the retracted configuration and the roof 3 in its entirety is arranged essentially vertically. Then the covering element or roof 3 is displaced downwards until it reaches the final concealed position where it is contained within the stowage compartment 6 lying in a vertical position, with the panels 30 and 31 in the retracted configuration.

In the variation of embodiment according to FIG. 3, the necessary height for the stowage compartment 6 is substantially reduced. This solution may therefore also be used in motor cars where a so-called longitudinal "tunnel" extends between the front axle and the rear axle, which may reduce the space vertically available for forming the stowage compartment.

In the variant according to FIG. 3, the panels 30 and 31 of the covering element or roof 3 are able to pass from the unfolded operative configuration into the retracted configuration and vice versa, by means of substantially relative sliding movements, as indicated by the arrow F5.

Figure 4:
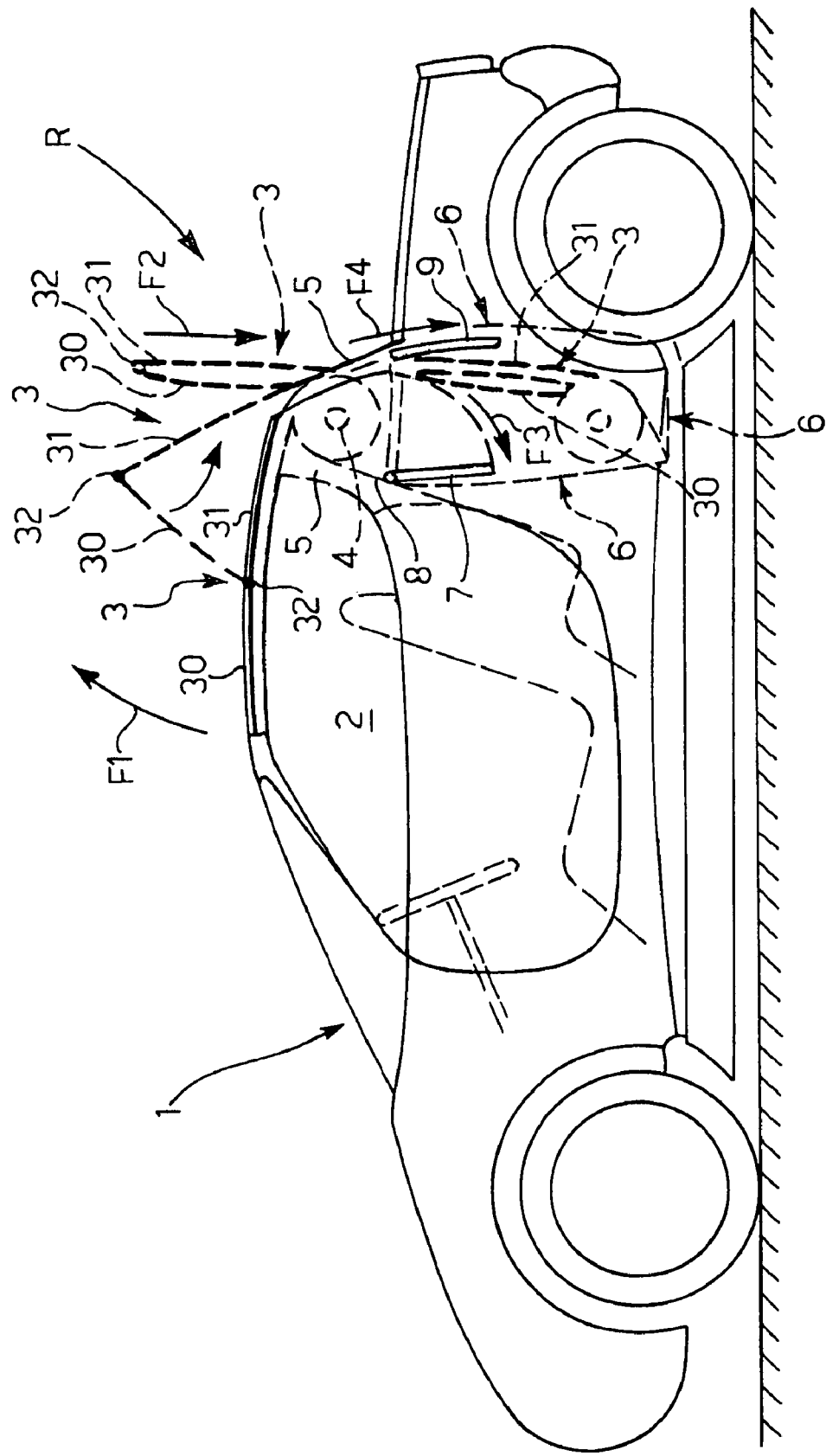

FIG. 4, in which parts and elements already described have again been assigned the same alphanumeric reference symbols used previously, shows a variation of embodiment in which the covering element or roof 3 comprises (at least) two panels 30 and 31 which are hinged together about (at least) one horizontal axis 32 and are able to pass from the unfolded condition into the retracted stowage position by means of pivoting movements about said axis.

As for the rest, the movement devices of the system according to FIG. 4 are similar to those of the system according to FIG. 3.

In all the variations of embodiments described above it is clear how, behind the stowage compartment 6, there is available inside the motor car 1 a still fairly considerable volume which can be used for the transportation of baggage and the like and/or for the arrangement of a rear/central propulsion device.

In variations of embodiment not shown, the abovementioned uprights 5 may be designed so that they are displaceable, relative to the bodywork of the motor car, between an extracted position (corresponding to the position shown in the figures described above) and an at least partially retracted position, and the devices for moving the openable roof 3 may be designed so as to cause said uprights to pass into the retracted position when the roof 3 is open and arranged inside the stowage compartment.

Obviously, without affecting the principle of the invention, the embodiments and the constructional details may be widely varied with respect to that described and illustrated purely by way of a non-limiting example, without thereby departing from the scope of the invention, as defined in the accompanying claims.

The invention claimed is:

1. Openable roof system (R) for a motor car (1), comprising:
    a covering element or roof (3) which in the vicinity of its rear end (3b) is mounted rotatably about a single, horizontal axis (4) which is fixed with respect to the motor car, between two parallel side pillars (5) fixed to and extending upwards from the bodywork of the motor car (1), close to the rear of the passenger compartment (2), said axis (4) extending between said pillars (5); and
    an essentially vertical stowage compartment (6) open towards the top, formed in the motor car (1) between and below said pillars (5),
    wherein the covering element or roof (3) is pivotable about said axis (4) between a closed position, where it is arranged so as to lie at least approximately horizontally, and a midway open position, where it is arranged so as to lie substantially vertically; said covering element or roof (3) then being displaceable downwards from said midway open position into a final concealed position where it is contained so as to lie substantially vertically inside said stowage compartment (6) and
    wherein a rear window (9) is mounted between said pillars (5) movably between a raised operative position and a lowered rest position where it is housed concealingly inside a receiving recess provided in the bodywork of the motor car (1) between and below said pillars (5),
    said covering element or roof (3) being movable to said final position separately from the rear window (9).

2. System according to claim 1, wherein said covering element or roof (3) comprises at least two panels (30, 31) which are configured to assume an unfolded operative configuration, where they are arranged longitudinally adjacent, and a retracted configuration, where they are arranged at least partly superimposed and have a reduced volume in the longitudinal direction, the stowage compartment (6) having in the vertical direction a correspondingly reduced size sufficient for receiving said covering element or roof (3) with said panels (30, 31) arranged in the retracted configuration.

3. System according to claim 2, wherein the panels (30, 31) of the covering element or roof (3) are configured to pass from the unfolded configuration into the retracted condition, and vice versa, by means of a substantially relative sliding movement.

4. System according to claim 2, wherein the panels (30, 31) of the covering element or roof (3) are hinged together about at least one horizontal axis (32) and are configured to pass from the unfolded configuration into the retracted configuration by means of pivoting movements about said at least one axis (32).

5. System according to claim 1, wherein, so as to allow said covering element or roof (3) to pass through, the stowage compartment (6) has an upper opening (6a) with which a movable closing hatch (7) is associated.

6. System according to claim 5, wherein said hatch (7) for closing the stowage compartment (6) is pivotable about a horizontal axis (8).

7. System according to claim 6, wherein said closing hatch (7) is pivotable about a horizontal axis (8) in the vicinity of its front end.

8. System according to claim 1, wherein said receiving recess is provided inside the stowage compartment (6).

9. System according to claim 1, wherein the covering element or roof (3) is movable from the closed position into the concealed position, and vice versa, in a completely manual manner.

10. System according to claim 1, wherein the covering element or roof (3) is movable from the closed position into the concealed position, and vice versa, in a motorized manner.

11. Openable roof system for a motor car according to claim 1, wherein the uprights (5) are displaceable, relative to the bodywork of the motor car (1), in a manual or motorized manner, between an extracted position and an at least partially retracted position.

* * * * *